No. 712,553. Patented Nov. 4, 1902.
I. A. LAWRENCE.
BICYCLE ATTACHMENT.
(Application filed Sept. 20, 1901.)

(No Model.)

Witnesses
J. P. Britt
Harry Ellis Chandler

Inventor
I. A. Lawrence,
Chandler & Chandler
Attorneys

UNITED STATES PATENT OFFICE.

IRA A. LAWRENCE, OF CAMPBELL, NEW YORK.

BICYCLE ATTACHMENT.

SPECIFICATION forming part of Letters Patent No. 712,553, dated November 4, 1902.

Application filed September 20, 1901. Serial No. 75,760. (No model.)

*To all whom it may concern:*

Be it known that I, IRA A. LAWRENCE, a citizen of the United States, residing at the town of Campbell, in the county of Steuben, State of New York, have invented certain new and useful Improvements in Bicycle Attachments; and I do hereby declare the following to be a full, clear, and exact description of the invention, such as will enable others skilled in the art to which it appertains to make and use the same.

This invention relates to bicycle attachments; and it has for its object to provide a device one of which may be attached to each side of the rear fork of a bicycle to receive and support the rear axle yieldably, so that ease and comfort in riding the bicycle may be promoted.

Other objects and advantages of the invention will be understood from the following description.

Figure 1:
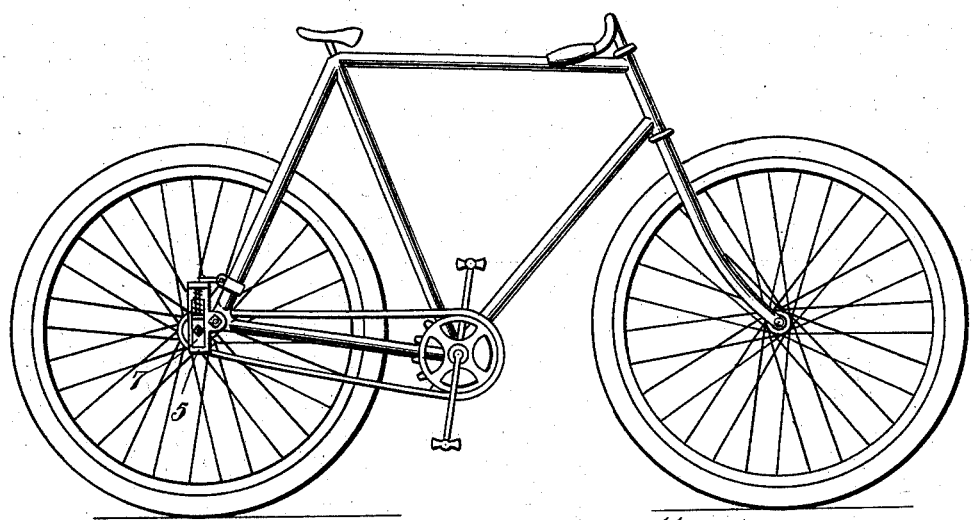
Figure 2:
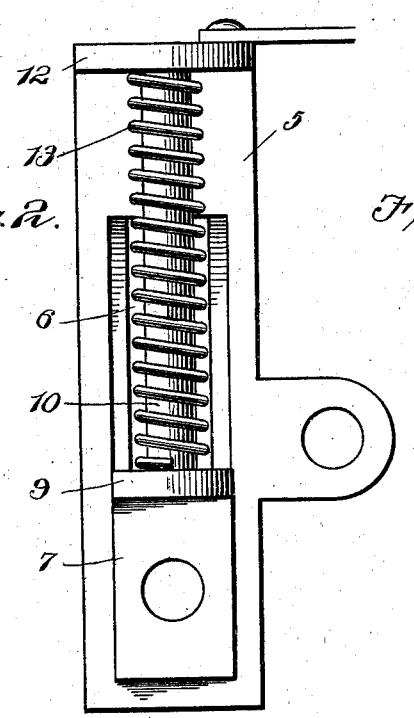
Figure 3:
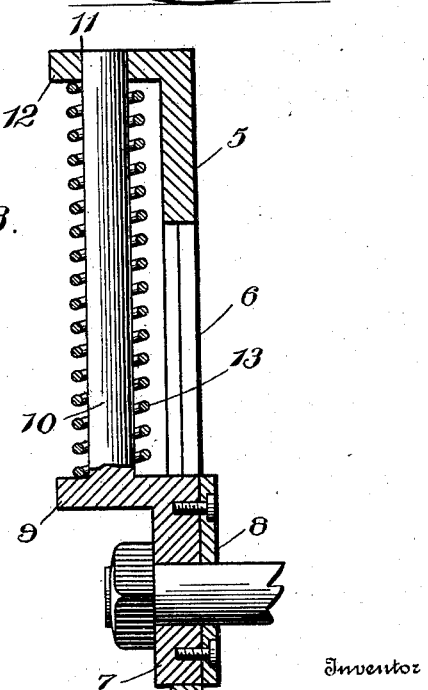

In the drawings forming a portion of this specification, and in which like numerals of reference indicate similar parts in the several views, Figure 1 is a side elevation of a bicycle equipped with the present invention. Fig. 2 is an enlarged elevation of the attachment. Fig. 3 is a section taken longitudinally through the attachment and showing the wheel-axle engaged with the sliding block or follower.

Referring now to the drawings, the attachment comprises a plate 5, having a rectangular opening 6 therein and which is countersunk at one side of the plate, and in this countersink is slidably disposed a block or follower 7, held against outward displacement by means of the plate 8, which is attached to the base of the block and projects beyond the edges of the opening. At one end of the block is a lug 9, from which extends a rod 10, passed through a perforation 11 in the lug 12 at the end of the plate 5, and upon this rod and disposed with its ends against the lugs is a helical spring 13, which holds the block normally and yieldably at the lower end of the opening of the plate.

In practice the plate 5 is disposed against the fork side of the bicycle-frame and is held in such position by means of clips 14, which are passed around the side and engaged with the plate, the sliding block being disposed downwardly.

The sliding block 7 has a perforation therethrough and alining with a perforation in the plate 8, and through these alining perforations is passed the end of the rear-wheel axle of the bicycle.

It will be understood, of course, that one of these attachments is provided for each side of the rear fork of the bicycle, so that both ends of the rear axle are yieldably supported. With this construction it will be seen that the depression of the rear of the bicycle-frame is directly resisted by the helical springs of the attachments, with the result that a great part of the vibrations is absorbed and ease and comfort in riding is secured.

In practice modifications of the specific construction shown may be made, and any suitable materials and proportions may be used for the various parts without departing from the spirit of the invention.

What is claimed is—

The combination with a bicycle-frame including rear forks and rear tie-rods rigidly connected at opposite sides of the frame and having openings at their points of connection to receive a wheel-axle, of a plate at each side of the frame, each of said plates having a laterally-projecting lug at one edge having a perforation and a bolt engaged with said perforation and the axle-receiving opening at that side of the frame, said plate having also a longitudinal slot and a lug at one end beyond the slot and provided with a perforation, a block having a reduced portion slidably engaged in the slot of the plate and having a plate secured thereagainst and overlapping the slotted plate to prevent withdrawal of the block, a lug upon the side of the block having a rod slidably engaged in the perforation of the lug at the end of the plate, a helical spring upon the rod to hold the block yieldably at one end of the slot of the plate, a brace connected to the upper end of the plate and having a clip engaged with the adjacent fork side, and a wheel having an axle engaged with the blocks of the two plates.

In testimony whereof I affix my signature in presence of two witnesses.

IRA A. LAWRENCE.

Witnesses:
WILLIAM E. HOWELL,
ARTHUR J. BERNS.